June 13, 1967        W. E. BUCK        3,325,241

CONTINUOUS WRITING STREAK AND FRAMING CAMERA

Filed Jan. 18, 1965        2 Sheets-Sheet 1

INVENTOR
WILLARD E. BUCK
BY
ATTORNEYS

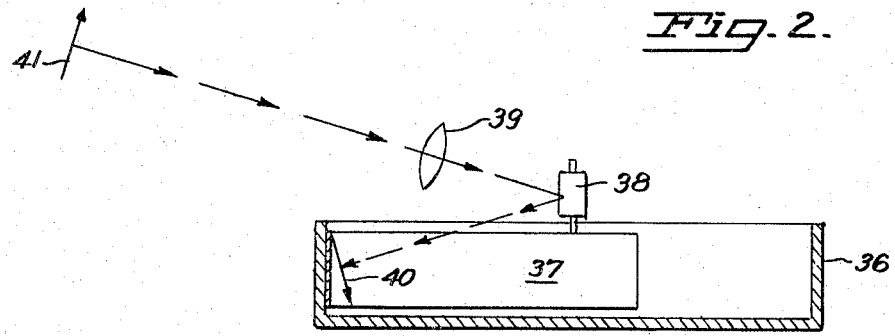
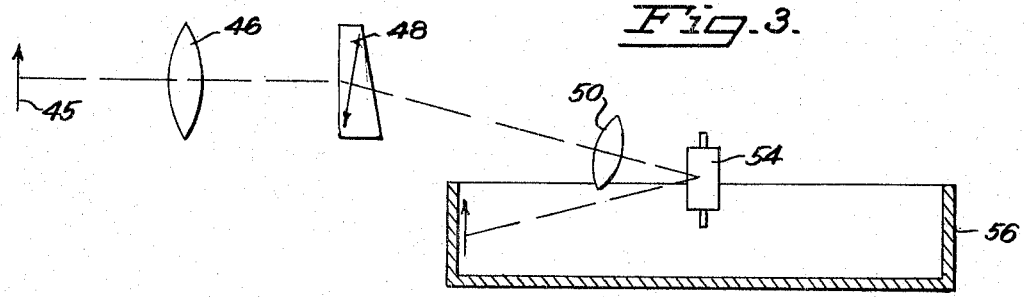
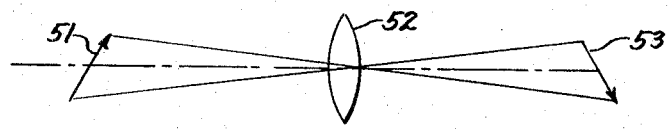
INVENTOR
WILLARD E. BUCK
BY
ATTORNEYS

United States Patent Office 3,325,241
Patented June 13, 1967

3,325,241
CONTINUOUS WRITING STREAK AND
FRAMING CAMERA
Willard E. Buck, Santa Clara, Calif., assignor, by mesne assignments, to Technical Operations, Incorporated, Burlington, Mass., a corporation of Delaware
Filed Jan. 18, 1965, Ser. No. 426,318
1 Claim. (Cl. 352—84)

ABSTRACT OF THE DISCLOSURE

A high speed photographic instrument capable of making a framed record and a streak record simultaneously and utilizing mirrors for framing optics and utilizing less space than cameras designed to produce the same general result.

---

High speed framing cameras of the kind disclosed in the Willard E. Buck Patent No. 2,968,989 are capable of making framed exposures at rates of several million exposures per second. The same patent also affords an example of a rotating mirror type continuous writing framing camera in which two strips of film are so arranged with respect to a multi-faced rotating mirror that a beam of light reflected by the mirror and containing an image to be recorded will be continuously capable of impinging one or the other strips of film as it is reflected by one or another of the faces of the mirror.

The use of streak cameras is well known and a camera for producing a streak record and simultaneously producing a framed record of the same event is disclosed in the Lawrence R. Teeple, Jr. Patent No. 3,143,051. The camera of this Teeple patent is not capable of continuous writing and the camera of the above mentioned Buck patent, while of the continuous writing type, is quite large and heavy.

It is the principal object of the present invention to provide a continuous writing camera for simultaneously making streak and framed records of the same event.

Another object of the invention is to provide a camera of the continuous writing type of much smaller size than heretofore known by employing mirror optics for producing a long sweep of an image carrying beam in a relatively small space.

A still further object of the invention is to provide means in a camera of the kind described to correct angularity between image plane and film plane which results from bringing a focused beam over the rim of a cylindrical housing in which the film is supported.

Further objects and advantages of the invention will become apparent upon an understanding of the following description wherein the invention is described in detail by reference to the accompanying drawings.

In the drawings:

FIG. 2 is a schematic view illustrating difficulty encountered in a continuous writing camera in focusing an image on film supported on the inner wall of its housing;

FIG. 3 is a schematic view illustrating the effect of the use of an image inclining prism in accordance with the present invention; and FIG. 4 is a schematic view in explanation of the phenomena taking place in the arrangement of FIG. 3.

Continuous writing can be accomplished in a framing camera by the use of a multi-faced, usually triangular, mirror and two strips of film arranged on opposite sides of a cylindrical film support. A beam splitter or dual apertures are employed to separate the beam of light containing an image to be recorded into two beams which are then directed toward the rotating mirror from opposite sides thereof. The arrangement is such that one face of the mirror through suitable stops and lenses causes one beam of light to sweep the film and produce framed exposures on one side of the housing and, as the beam approaches the end of the film track, another face of the mirror commences to sweep the other beam across the film on the other side of the housing. The arrangement is such that the ability of the camera to expose film is continuous. Consequently it is unnecessary to synchronize the position of the rotating mirror with the event to be recorded but simply necessary, once the mirror is in motion, to synchronize the opening of a shutter with the event to be recorded and recording will start on one strip or the other of film and continue until the shutter is closed.

Figure 1:
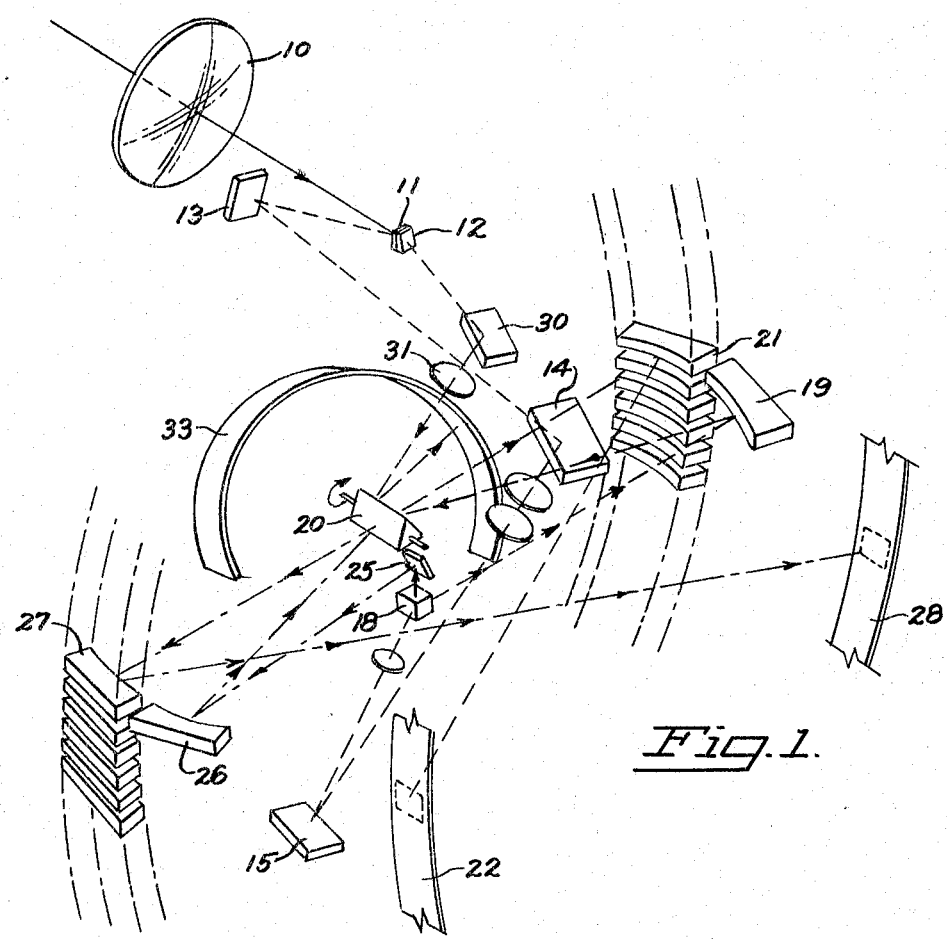
FIG. 1 is a perspective schematic view showing the arrangement of the principal optical elements of a camera constructed in accordance with the present invention.

This is illustrated in FIG. 1 of the drawings wherein the optical elements of the camera of the present invention are pictured, omitting shutters, stops and other elements which are not essential to an understanding of the present invention. The elements are arranged in a generally cylindrical housing which is not shown and the beam of light containing the image to be recorded is introduced through an objective system represented by the lens 10. This beam impinges a mirrored surface between two prisms shown at 11 and 12 the function of which will later be described in detail. From this mirror the beam is reflected as indicated by the broken line arrows by mirrors 13, 14 and 15 meanwhile passing through suitable lenses as indicated and thence to a beam splitter 18 which is a half silvered mirror between prisms. One of the beams, leaving the splitter and represented by the same broken line arrows, is reflected by a mirror 19 the face of which is a concave sphere segment to a high speed triangular rotating mirror 20. The rotating mirror sweeps the beams across a series of identical mirrors shown at 21 which in turn direct the beam toward and focus the image at the plane of an arcuate strip of film represented at 22. Thus with the use of conventional stops, not shown, spaced images or framed records are produced on the film strip 22 throughout its length which in practice is approximately 120° of the inside surface of the cylindrical housing. Returning to the beam splitter 18 the second beam produced thereby is represented by dot and dash line arrows and is reflected by a mirror 25 to a spherical mirror 26 identical to the mirror 19 and thence to the rotating mirror 20 which sweeps it across a set of focusing mirrors 27 corresponding to the mirrors 21 and then to the film strip 28 disposed oppositely to the strip 22 in the housing.

The mirrors 21 and 27 constitute the relay optics of the camera and the substitution of these mirrors for conventional relay lenses as shown for example in the Buck Patent 2,968,989 enables a significant reduction in camera size. This results from the fact that the beam from the rotating mirror to the film track is reversed in direction or "folded back" by the mirror type relay optics thus reducing the necessary distance between the rotating mirror and the film track.

A streak record may be produced by admitting a narrow beam of light from an object to be recorded through a slit aperture and sweeping this beam by the medium of a rotating mirror across the surface of a strip of film to create an exposure in the form of a smear or streak. Such a record is useful in the analysis of certain types of phenomena. The camera of the present invention produces a streak record through an optical path also illustrated in FIG. 1. The mirrored surface between the prisms 11 and 12 previously referred to is not continuous but permits the passage of light through a very narrow space which is effective as the slit of a streak camera. The path of light passing through this slit is represented by the dotted line arrows as impinging a mirror 30 from which it is focused by a lens 31 via the rotating mirror 20 which sweeps the image throughout the length of a third strip of film represented at 33 as being continuously arranged in an arcuate path throughout 240° of a circle.

Figure 5:
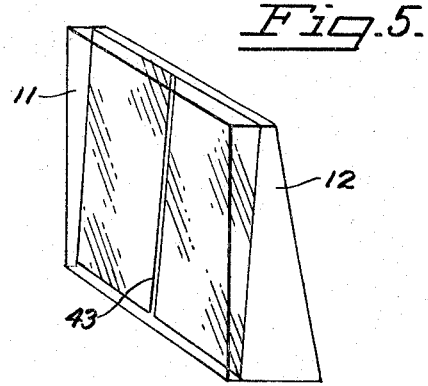

In most continuous writing cameras perfect resolution is impossible because of angularity between the image at the film plane and the film plane itself. For example, in FIG. 2 a cylindrical camera housing is represented at 36 and a strip of film 37 is disposed against its inner surface on an arc which is struck approximately from the center of rotation of a rotating mirror 38 and spaced from the mirror in the direction of its axis of rotation. In order to avoid placing optical components in the path of the reflected beam of the rotating mirror, it is disposed outside of the housing to reflect an image focused by a lens 39 to appear at the surface of the film. Because of this arrangement, the image 40 of the object illustrated at 41 assumes an angle with respect to the film plane with the result that the entire image can not be focused at the film plane and good resolution is sacrificed. The present invention corrects this angularity by the use of an image inclining prism to effect the image directed to the streak camera as well as the images directed to the framing camera. The image inclining prisms 11 and 12 are shown enlarged in FIG. 5 and as previously described the prism 12 has a mirrored surface with a slit 43 therein through which light passes on its way toward the film where a streak image is recorded. The mirror surface reflects the rest of the light beam back toward the framing camera optics.

For an illustration of the function of an image inclining prism, FIG. 3 shows an object 45 focused by a lens 46, which would be the objective lens on a camera, to create an image in an image inclining prism represented at 48. Because of the refractive qualities of glass and the shape of the prism a lens 50 sees this image at an angle to its optical axis. This creates the result shown in FIG. 4 wherein object 51 disposed at an angle to the optical axis of a lens 52 is focused by the lens to create an image shown at 53 as being disposed at the opposite angle. Consequently, the angle of the image as it occurs in the prism 48 of FIG. 3 is reversed when it is focused by the lens 50 and reflected by the mirror 54 to the film supporting surface of the housing represented at 56. As the invention is practiced in the present instance the combined effect of prisms 11 and 12 serve to incline the image which passes through slit 43 and to the streak camera film. On the other hand, the single prism 11 inclines the image directed to the framing camera film, the light being refracted to some degree as it enters the prism and additionally as it is reflected back by the mirror.

The image from objective system occurs within the prism 11 and this greatly reduces chromatic abberation characteristic of systems containing a prism.

I claim:

In a high speed framing camera in which a rotating mirror swings a beam containing an image to be recorded upon film, an arcuate support for the film, and a mirror relay optical system intercepting the beam between the rotating mirror and the film to reverse its direction and minimize the distance between the mirror and the film, said optical system including image forming components in the form of concave mirrors, an objective system, a mirror intercepting light from the objective system and reflecting it toward the rotating mirror, said intercepting mirror having a slit for the passage of a narrow beam of light, a second arcuate film support and means to direct said narrow beam to the rotating mirror for reflection thereby to produce a streak record upon film on the second support.

References Cited
UNITED STATES PATENTS

| | | | |
|---|---|---|---|
| 2,816,476 | 12/1957 | Rogers et al. | 352—84 |
| 2,968,989 | 1/1961 | Buck | 352—84 |
| 3,045,542 | 7/1962 | Finkelstein | 88—24 |
| 3,165,752 | 1/1965 | Jacobs | 352—84 |

JULIA E. COINER, *Primary Examiner.*